(12) United States Patent
Morbidelli et al.

(10) Patent No.: US 7,686,958 B2
(45) Date of Patent: Mar. 30, 2010

(54) METHOD FOR THE PRODUCTION OF A CHEMICAL REACTION PRODUCT WITH THE AID OF A FIXED-BED REACTOR

(75) Inventors: Massimo Morbidelli, Zurich (CH); Marco Mazzotti, Zurich (CH); Adalbert Prior, Maeder (AT); Joachim Prior, Goetzis (AT); Frank Lang, Chur (CH)

(73) Assignee: A.L.P. Technology AG, Zurich (CH)

( * ) Notice: Subject to any disclaimer, the term of this patent is extended or adjusted under 35 U.S.C. 154(b) by 39 days.

(21) Appl. No.: 10/586,065

(22) PCT Filed: Jan. 13, 2005

(86) PCT No.: PCT/AT2005/000002
§ 371 (c)(1),
(2), (4) Date: Aug. 24, 2007

(87) PCT Pub. No.: WO2005/068042
PCT Pub. Date: Jul. 28, 2005

(65) Prior Publication Data
US 2008/0132722 A1 Jun. 5, 2008

(30) Foreign Application Priority Data
Jan. 15, 2004 (AT) .............................. A 042/2004

(51) Int. Cl.
*B01D 15/08* (2006.01)
*C07C 39/16* (2006.01)

(52) U.S. Cl. .................. 210/656; 210/267; 210/635; 560/129; 568/727; 568/728

(58) Field of Classification Search ................. 210/267, 210/635, 656; 423/7; 560/129; 568/727, 568/728
See application file for complete search history.

(56) References Cited

U.S. PATENT DOCUMENTS 3,971,842 A 7/1976 Ewbank
5,470,479 A * 11/1995 Snyder et al. ................ 210/635

FOREIGN PATENT DOCUMENTS

AT 405026 B 4/1999
WO WO 99/29388 * 6/1999

OTHER PUBLICATIONS

Prior Separation Technology GMBH, WO 99/29388, 1999, English translation 6 pages.*

* cited by examiner

Primary Examiner—Porfirio Nazario-Gonzalez
Assistant Examiner—Yate'k Cutliff
(74) Attorney, Agent, or Firm—Townsend and Townsend and Crew, LLP

(57) ABSTRACT

Disclosed is a method for producing at least one chemical reaction product by chemically reacting one or several reactants that is/are optionally dissolved in one or several solvents and is/are supplied as a feed stream by bringing the same in contact with a heterogeneous catalyst in a continuously operated fixed-bed reactor which is filled with a particle bed, a continuous annular chromatograph (CAC) that is filled with the particle bed being used as a fixed-bed reaction in which the at least one reaction product is formed and purified while the at least one purified reaction product as well as optionally provided secondary products and/or non-reacted reactants are withdrawn at a different, predetermined azimuthal position of the annular chromatograph, respectively. The inventive method is characterized in that only one type of particle material is used in a single particle bed as both a formation catalyst and a chromatographic medium for purifying the at least one reaction product in the particle bed.

23 Claims, 12 Drawing Sheets

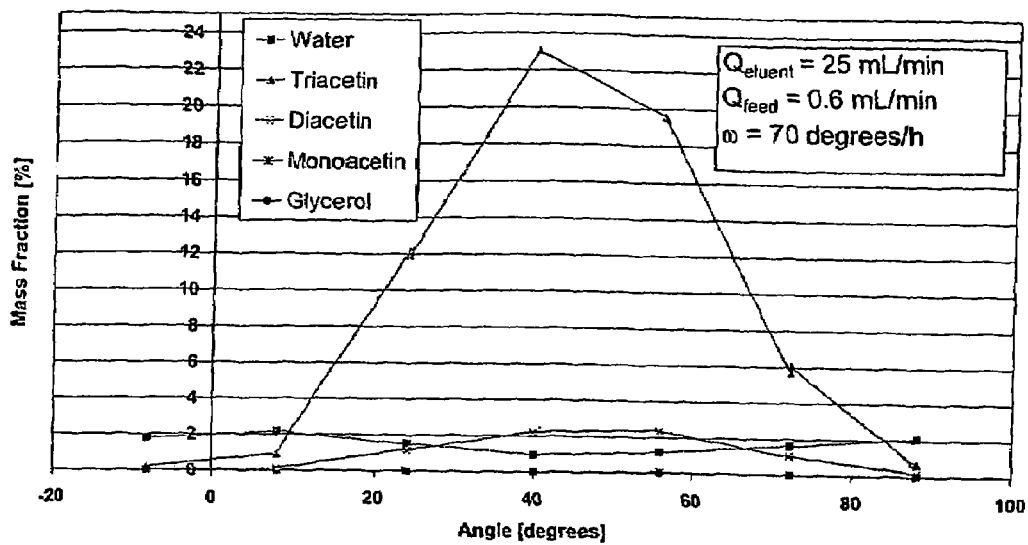
FIGUR 2.1
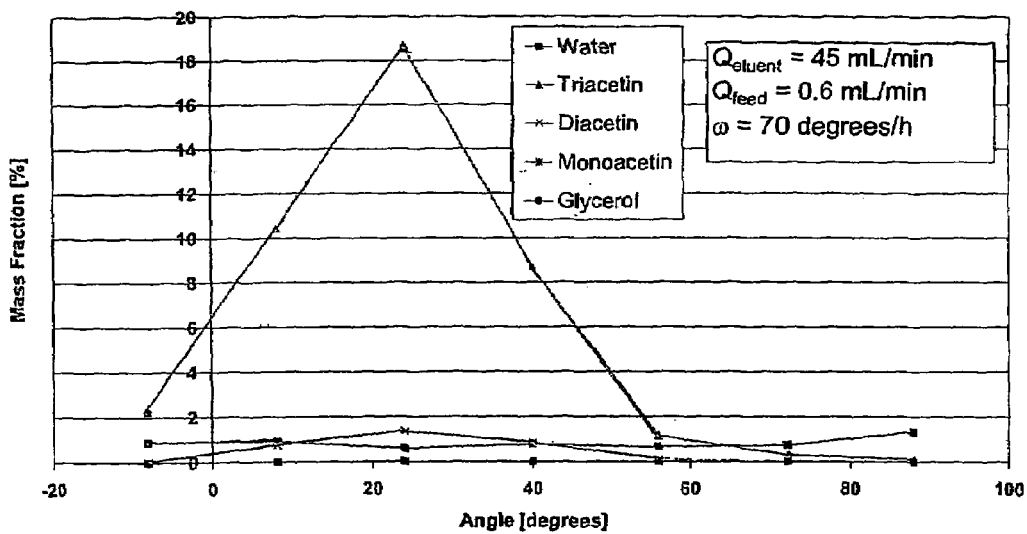
FIGUR 2.2

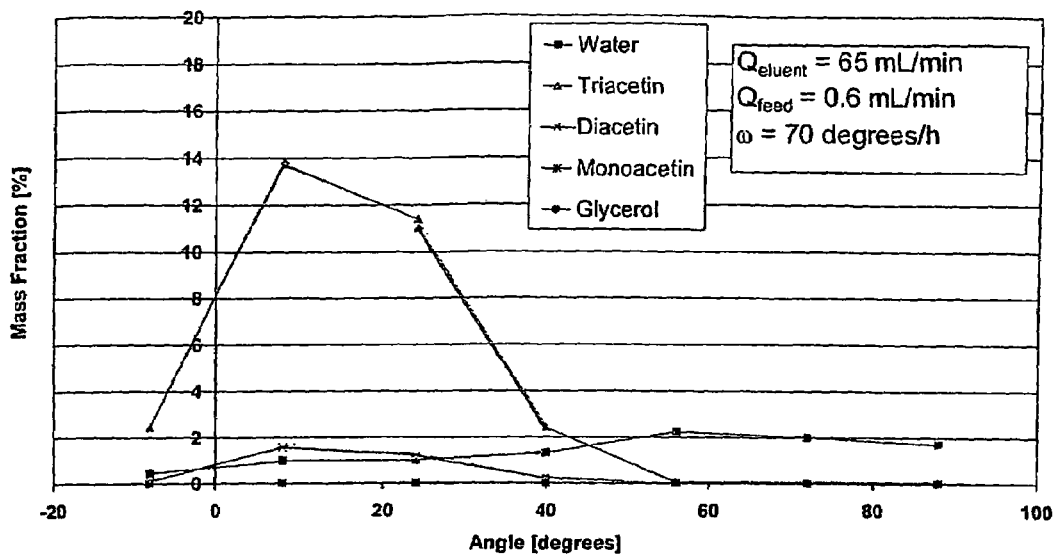
FIGUR 2.3
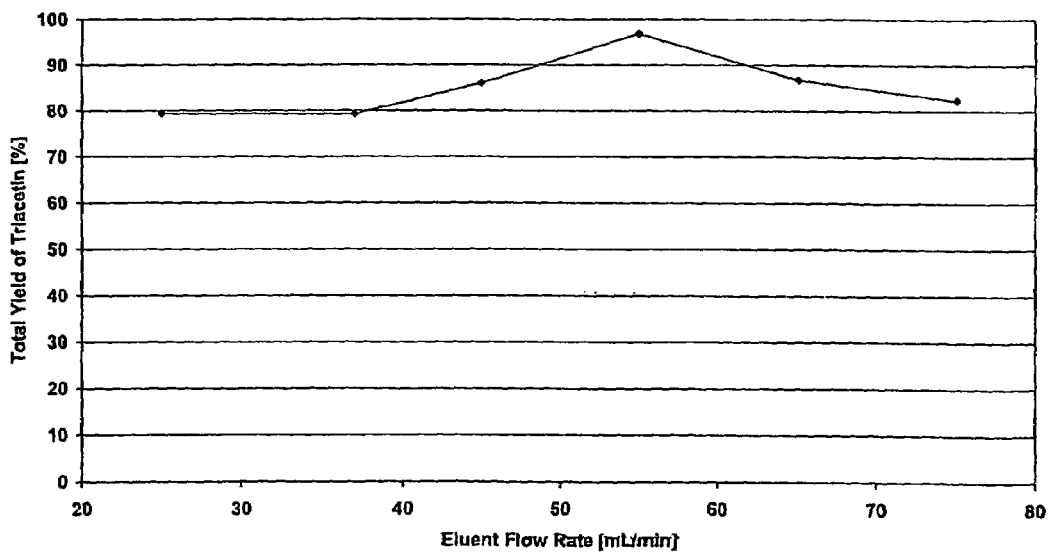
FIGUR 2.4

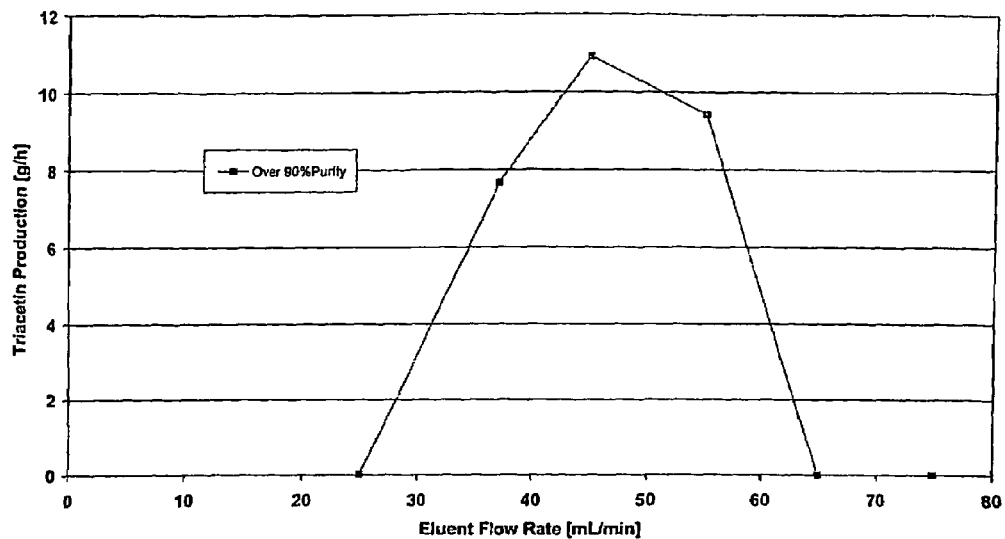
FIGUR 2.5
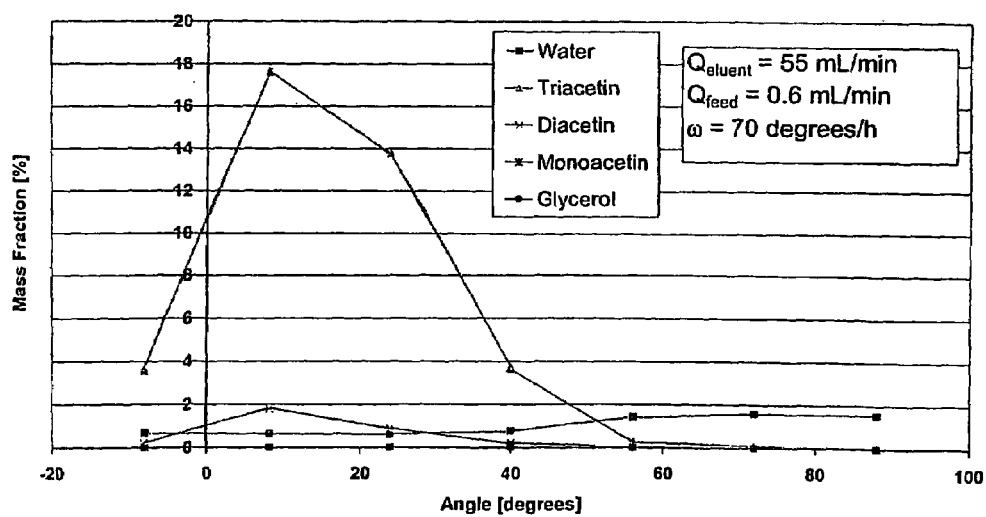
FIGUR 2.6

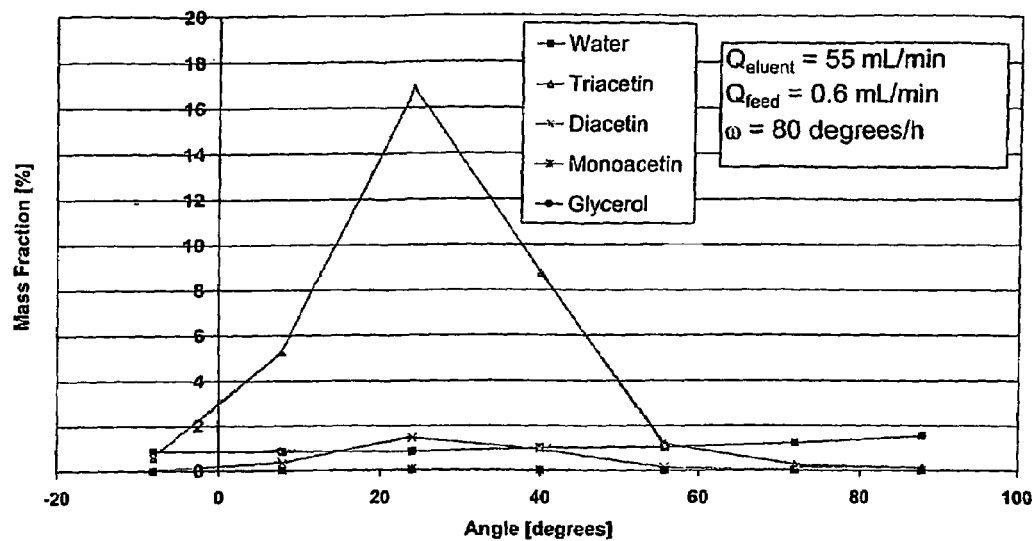
FIGUR 2.7
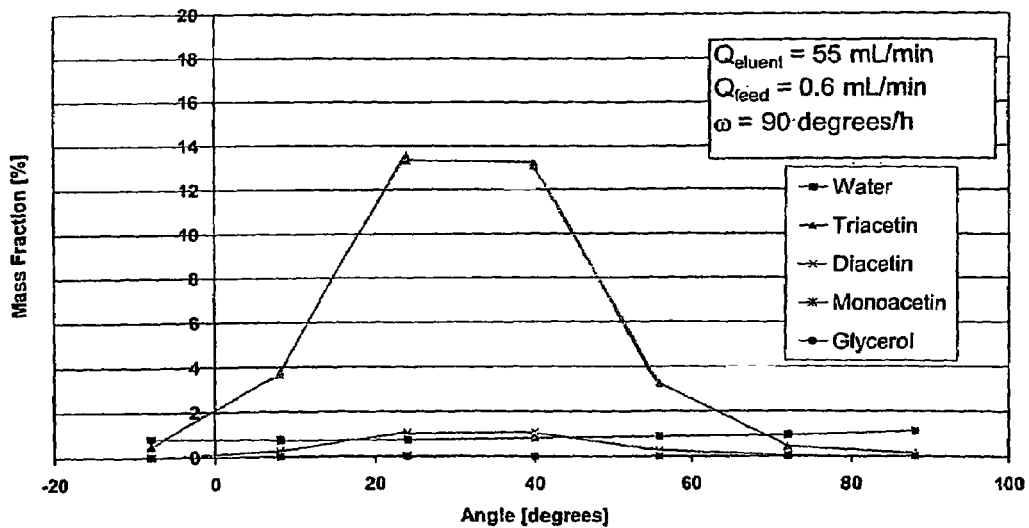
FIGUR 2.8

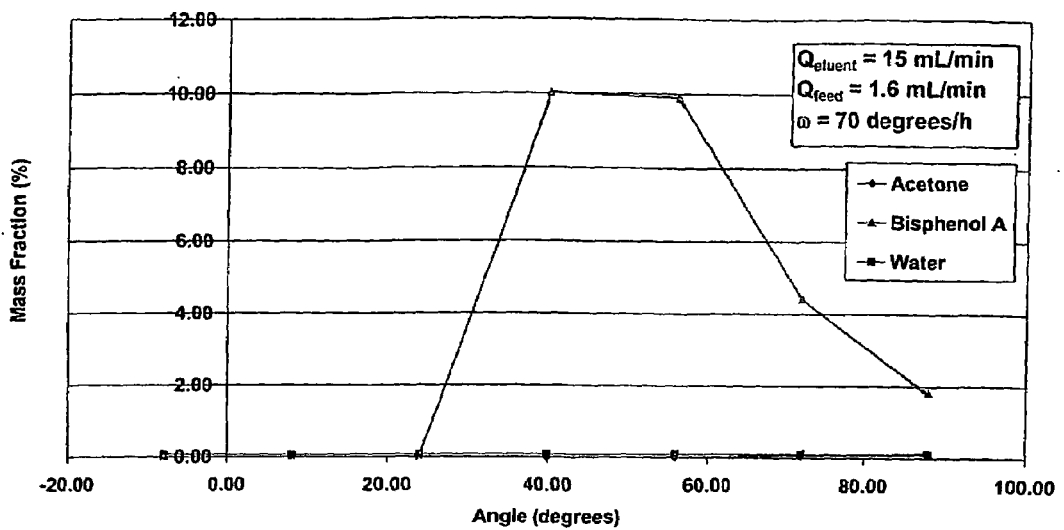
FIGUR 3.1
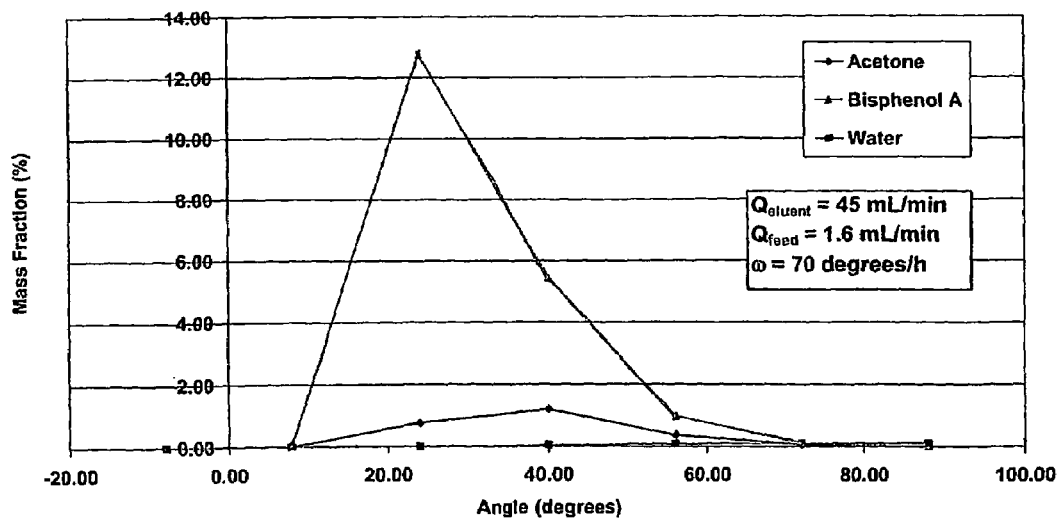
FIGUR 3.2

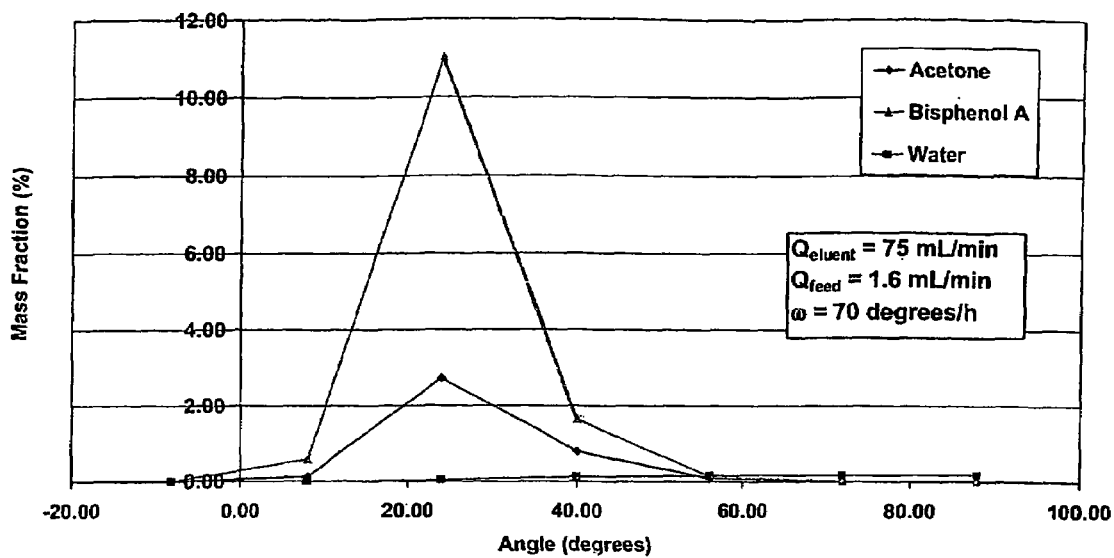
FIGUR 3.3
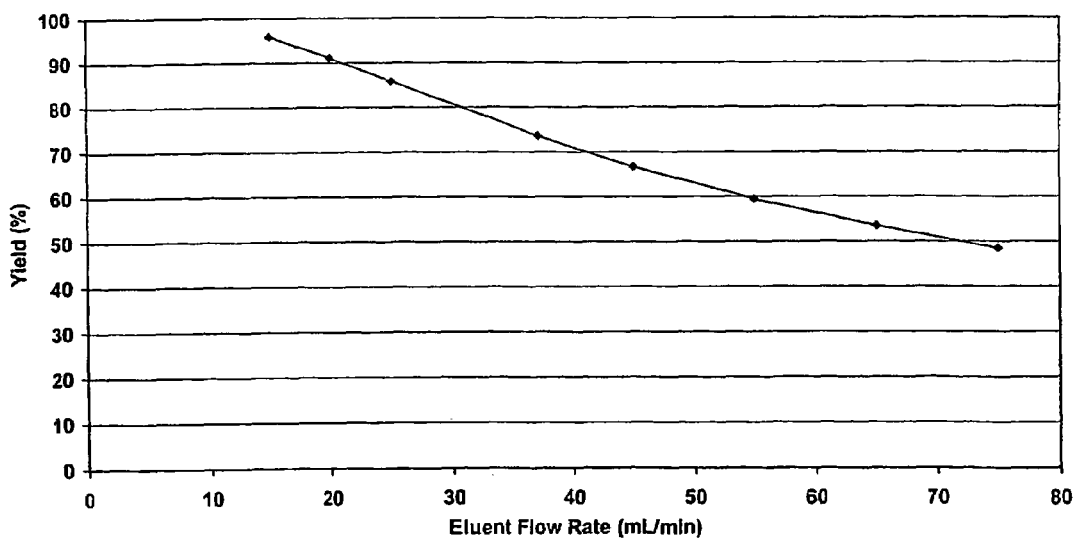
FIGUR 3.4

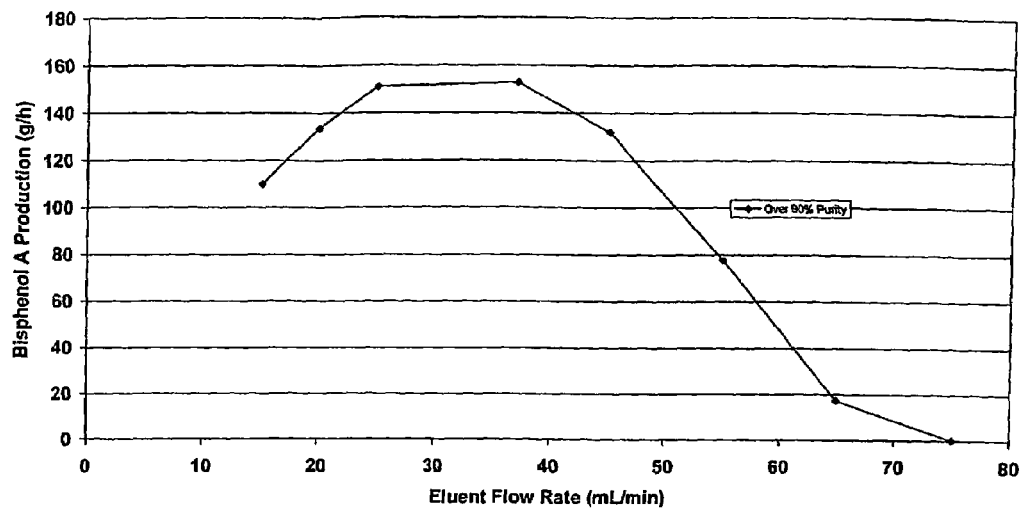
FIGUR 3.5
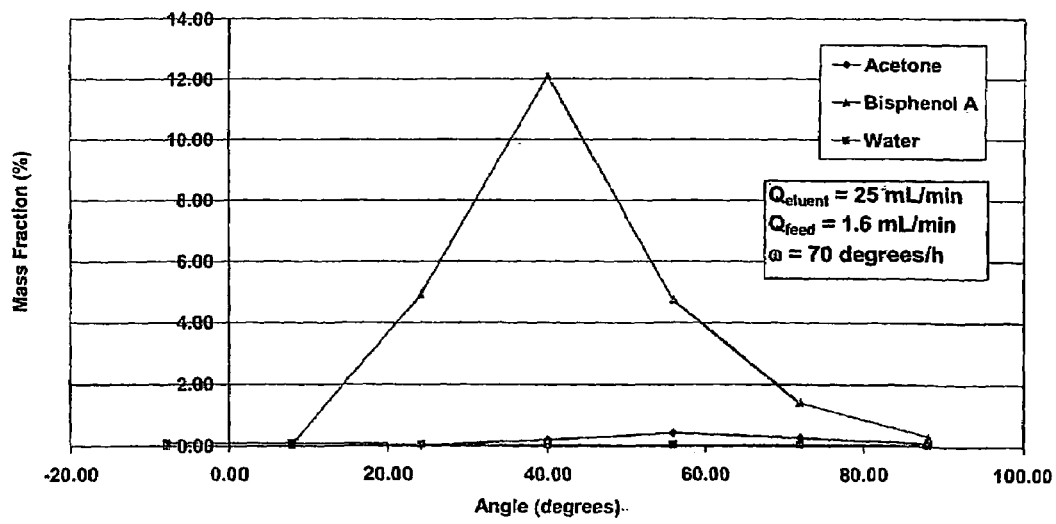
FIGUR 3.6

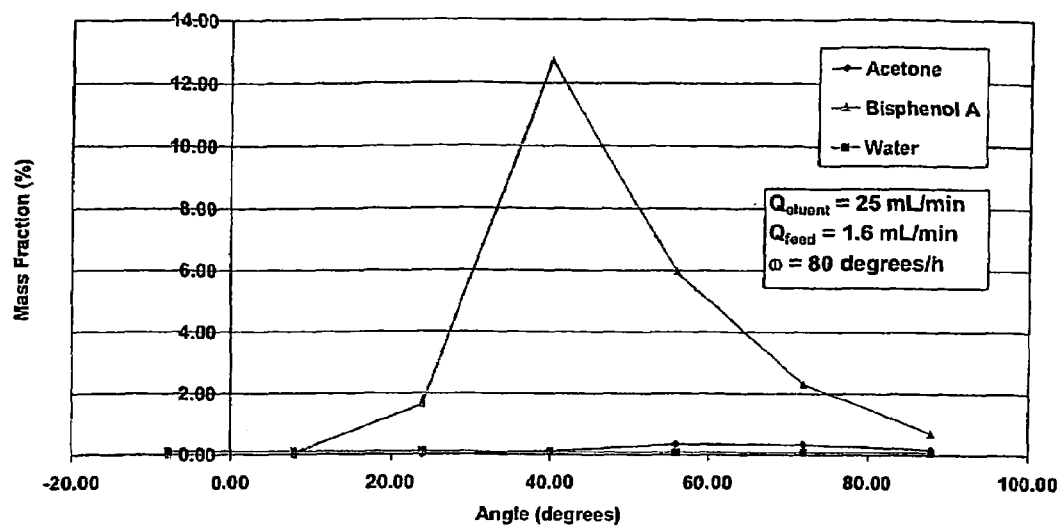
FIGUR 3.7
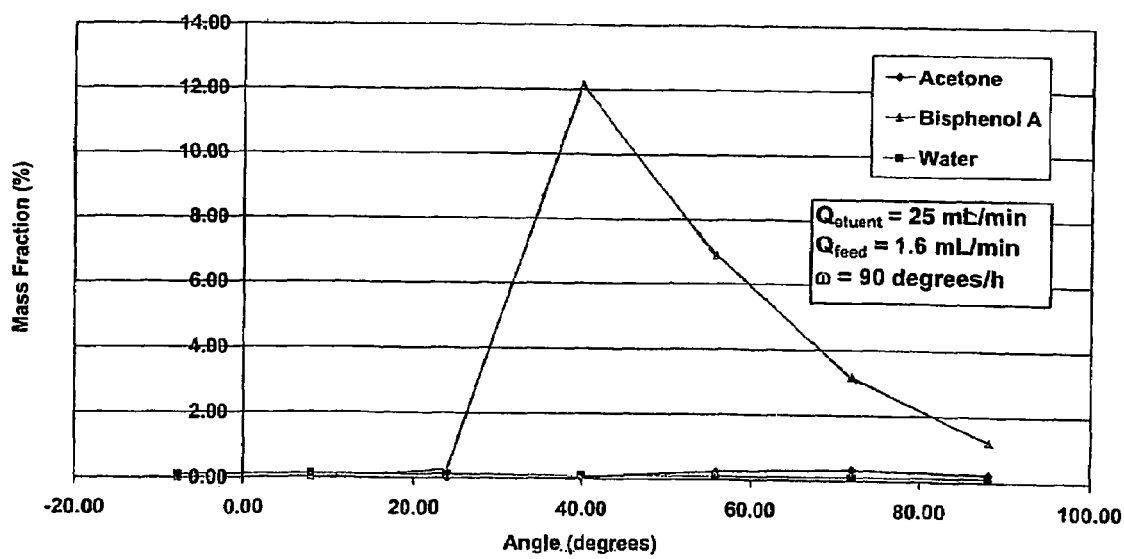
FIGUR 3.8

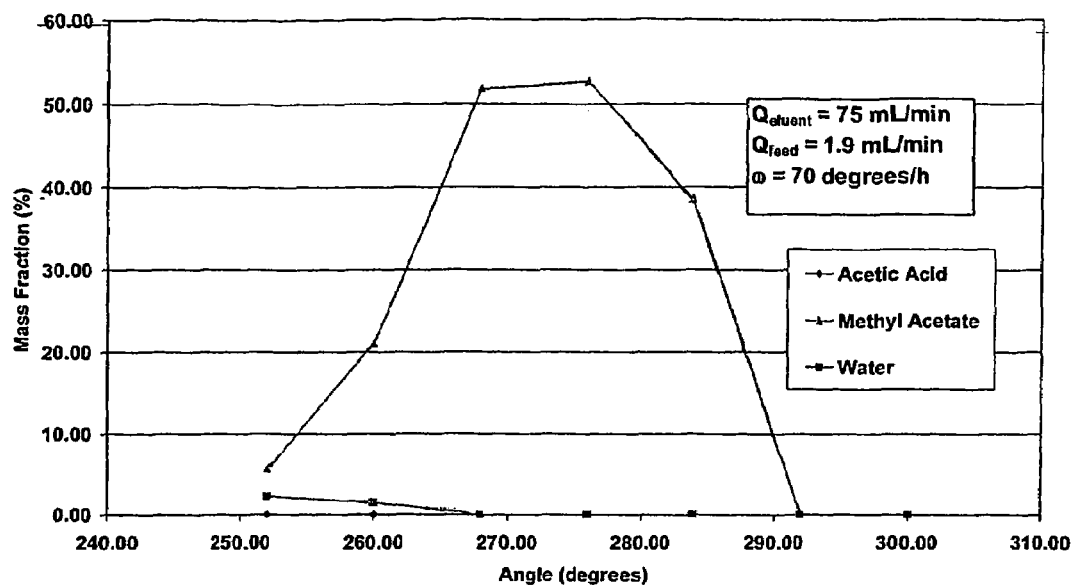
FIGUR 4.1
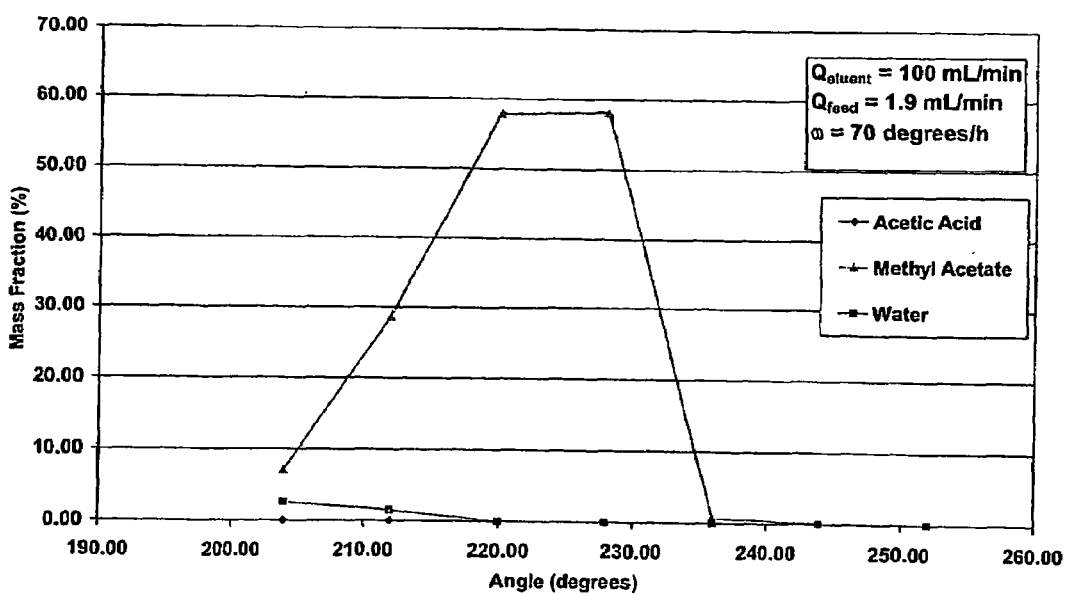
FIGUR 4.2

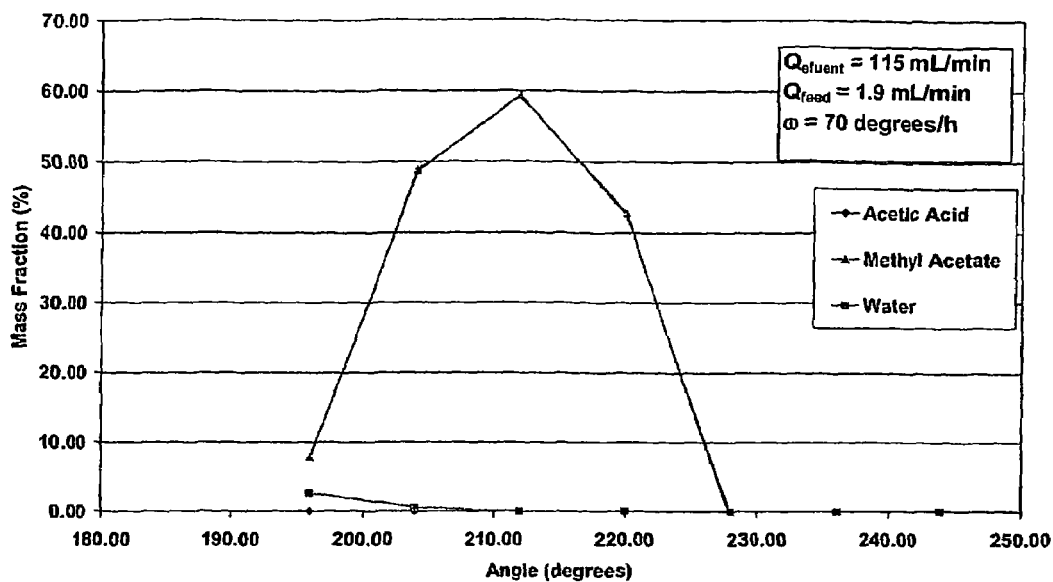
FIGUR 4.3
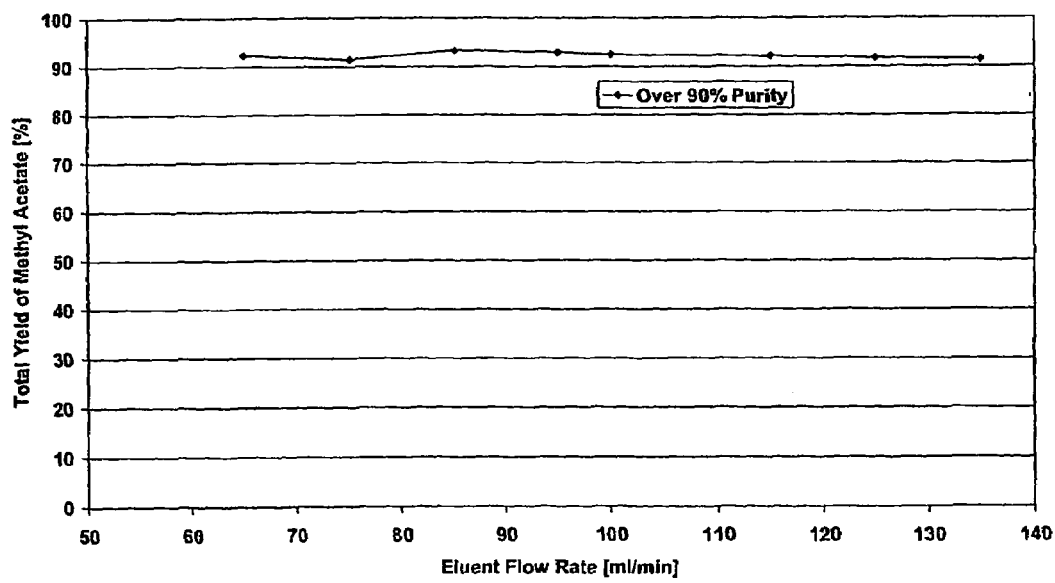
FIGUR 4.4

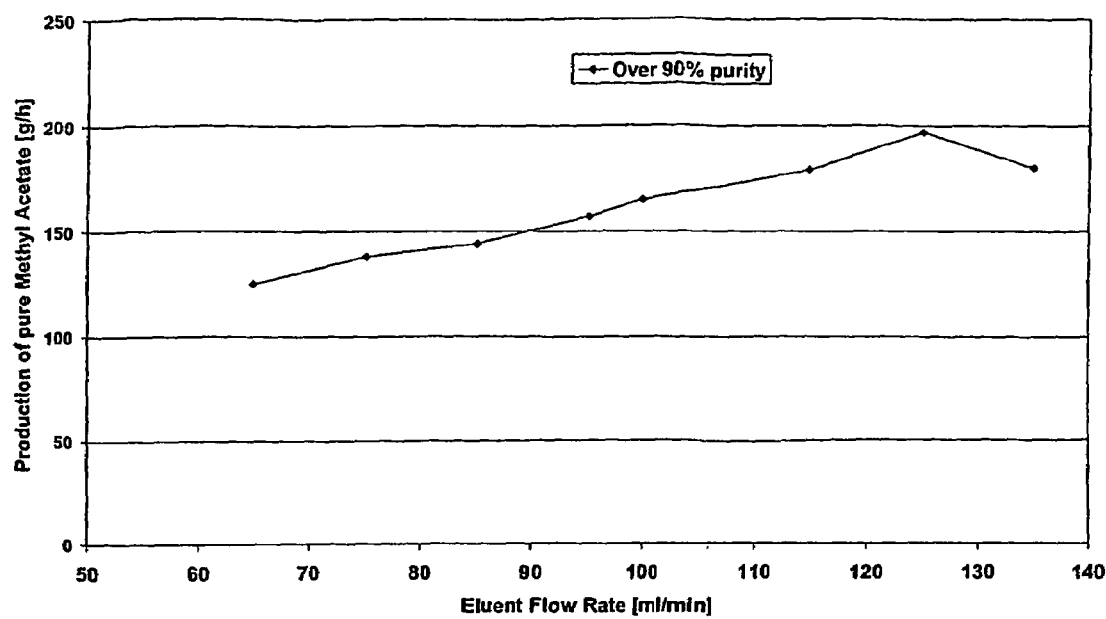
FIGUR 4.5

_US 7,686,958 B2_

METHOD FOR THE PRODUCTION OF A CHEMICAL REACTION PRODUCT WITH THE AID OF A FIXED-BED REACTOR

The present invention relates to a method for preparing a chemical reaction product from one or more reactants through the contact with a heterogeneous catalyst in a fixed-bed reactor.

PRIOR ART

A typical P-CAC (preparative continuous annular chromatography) device consists of an annular particle bed which is packed inside the gap (annular clearance) between two concentric cylinders. During the rotation of the particle bed around its axis, a feed solution containing the mixture to be separated and one or more eluents is continuously supplied from the top. Such procedures are known in the art (see EP-A-371,648, for example). P-CAC devices have been used for chromatographic separation of mixed substances only.

In the AT-A-405,026, the applicant of the present invention has, for the first time, described the use of such a continuously operating annular chromatograph as a reaction medium, with the particle bed being divided into two or more zones comprising at least one reaction zone and at least one separation zone, which are separated from one another by separating layers made of diaphragms, non-porous inert materials or electrically non-conductive materials. A chemical product formed in the reaction zone under the action of the catalyst is then chromatographically purified from starting materials, by-products, if any, and catalyst in at least one separation zone and is recovered from the reactor/chromatograph in substantially pure form.

However, apart from the various advantages that can be obtained this way, this type of "reactive chromatography" is material intensive and costly as it is necessary to provide different particle-bed materials for the reaction and separation zones, or at least differently coated bed materials (with metals, metal complexes or enzymes) for the reaction and separation zones, often also to provide different solvents and/or eluents as well as one or more separating layers. Providing varying flow cross-sections for locally controlling the flow rate (e.g. for concentrating process flows prior to passing into the next zone), which is also disclosed therein, further increases the complexity of the device as well as the costs.

Therefore, the aim of the present invention is to provide a method for synthesizing chemical products and separating the reactants, products and by-products in a fixed chromatographic bed of a continuously operated annular chromatograph while reducing the complexity of the device, the materials involved and the costs in comparison with the previously described AT-A-405,026, which is considered the closest prior art.

DISCLOSURE OF THE INVENTION

According to the invention, the above aim is achieved by a method for preparing at least one chemical reaction product by means of chemical reaction of one or more reactants, optionally dissolved in one or more solvents, which are supplied as a feed flow, through the contact with a heterogeneous catalyst in a continuously operated fixed-bed reactor packed with a particle bed, a continuous annular chromatograph (CAC), packed with the particle bed, being used as fixed-bed reactor in which the at least one reaction product is formed and purified and the at least one purified reaction product as well as any by-products and/or unreacted reactants present are withdrawn from the annular chromatograph, each at a different and predetermined rotational angle position, the method being characterized in that only one type of particulate material in a single particle bed is used as both the catalyst for the formation of the at least one reaction product in the particle bed and the chromatographic medium for the purification thereof.

With this procedure using a single particle bed as reaction and separating medium, the appropriate choice of process parameters (bed material, flow rate, temperature, pressure), which will be described in more detail below, eliminates the necessity of using different bed materials and of placing separating layers therebetween.

The procedure of the invention is the result of extensive research and optimization runs of the inventor, this result standing in complete contradiction to traditional teachings: chromatographic reactors have the inherent characteristic of showing different levels of affinity to different materials in order to allow their separation on the basis of the resulting differences in their rates of flow through the chromatographic bed.

However, highly differing migration speeds are, by definition, undesirable when carrying out continuous chemical reactions, especially when the aim of achieving quantitative conversion is pursued, because otherwise sufficiently long times of contact between the co-reactants (reactants, catalysts) would not be obtainable.

Furthermore, this method of the invention allows the continuous operation of the annular chromatograph, the reaction equilibrium being shifted towards the final product by continuously withdrawing the reaction product, so that the reactant(s) is/are preferably converted into reaction product(s), whereby a substantially quantitative conversion is preferably brought about.

Unreacted reactants and/or by-products are preferably recirculated and reused in the chemical reaction. This ensures efficient use of the chemicals employed.

According to preferred embodiments, the catalyst material is uniformly distributed in or on the particulate material. By rotating the annular chromatograph and continuously supplying the reactants, full contact between the reactants and the catalyst and therefore efficient mixing of these components are achieved. This ensures high conversion.

In particularly preferred embodiments, the particulate material entirely consists of catalyst material. This increases the surface and time of contact between the reactants and the catalyst, which in turn leads to improved conversion.

If an ion exchange resin is used as particulate material in another preferred embodiment, certain molecules can be retained in the resin. To achieve this, it is also possible to use a zeolite as particulate material, in order to further increase the separation efficiency, as will be explained in more detail below.

By heating and cooling the reaction/separation medium in a particularly preferred embodiment, highly sensitive control of the reaction parameters is possible, enabling the creation of several zones having different temperatures. For example, a continuous temperature gradient may be generated by heating and/or cooling during reaction. Adjusting different temperature values may be important, when a given reaction temperature must be kept; however, as temperature can also influence the chromatographic separation, various temperature ranges fall within the scope of the invention.

The characteristics of most zeolites, for example, are temperature-dependent. Some representatives of this class of silicates release crystal water when the temperature is elevated (without changing their crystal structure). For example, some zeolites have catalytic effects at temperatures above 150° C., while below this value, i.e. with a higher crystal water content, they show separating effects similar to those of a chromatographic gel. Using certain zeolites and generating different temperature zones, especially a temperature gradient which decreases from top to bottom, it is therefore possible to mainly use the catalytic effect of the respective zeolite in the upper, hotter bed sections first and then to mainly use its separating effect in the lower, cooler sections, without the laborious operation of coating the particulate material.

In further embodiments, at least one reactant, preferably, in order to enhance the reaction rate, all reactants, is/are dissolved in a solvent. In some embodiments, this solvent may at the same time serve as the eluent. In other embodiments, at least one of the reactants itself acts as solvent, which further simplifies the reaction procedure and saves costs.

In a particularly preferred embodiment, a polyvalent reactant is used as reactant which is able to form several different reaction products by reacting with the other reactant. The procedure is preferably controlled by controlling the operating parameters so as to enable the preferential recovery of one of the possible reaction products. It is particularly preferred to recover substantially only this product.

In a specifically optimized and preferred embodiment of the present invention, acetic acid and glycerol are supplied and substantially triacetin only is recovered as the preferred reaction product, i.e. monoacetin and diacetin are further reacted with acetic acid and do not accumulate as by-products. In other optimized embodiments, phenol and acetone are supplied and bisphenol A is recovered as the preferred reaction product. In other embodiments of the present invention, acetic acid and methanol are supplied and methyl acetate is quantitatively recovered.

BRIEF DESCRIPTION OF THE DRAWINGS

FIGS. 2.1 to 2.8 show concentration profiles for reactions of glycerol with acetic acid at different eluent flow rates, feed flow rates and rotation speeds.

FIGS. 3.1 to 3.8 show concentration profiles for reactions of phenol with acetone at different eluent flow rates, feed flow rates and rotation speeds.

FIGS. 4.1 to 4.5 show concentration profiles for reactions of glycerol with acetic acid at different eluent flow rates, feed flow rates and rotation speeds.

DETAILED DESCRIPTION OF THE INVENTION

Figure 1:
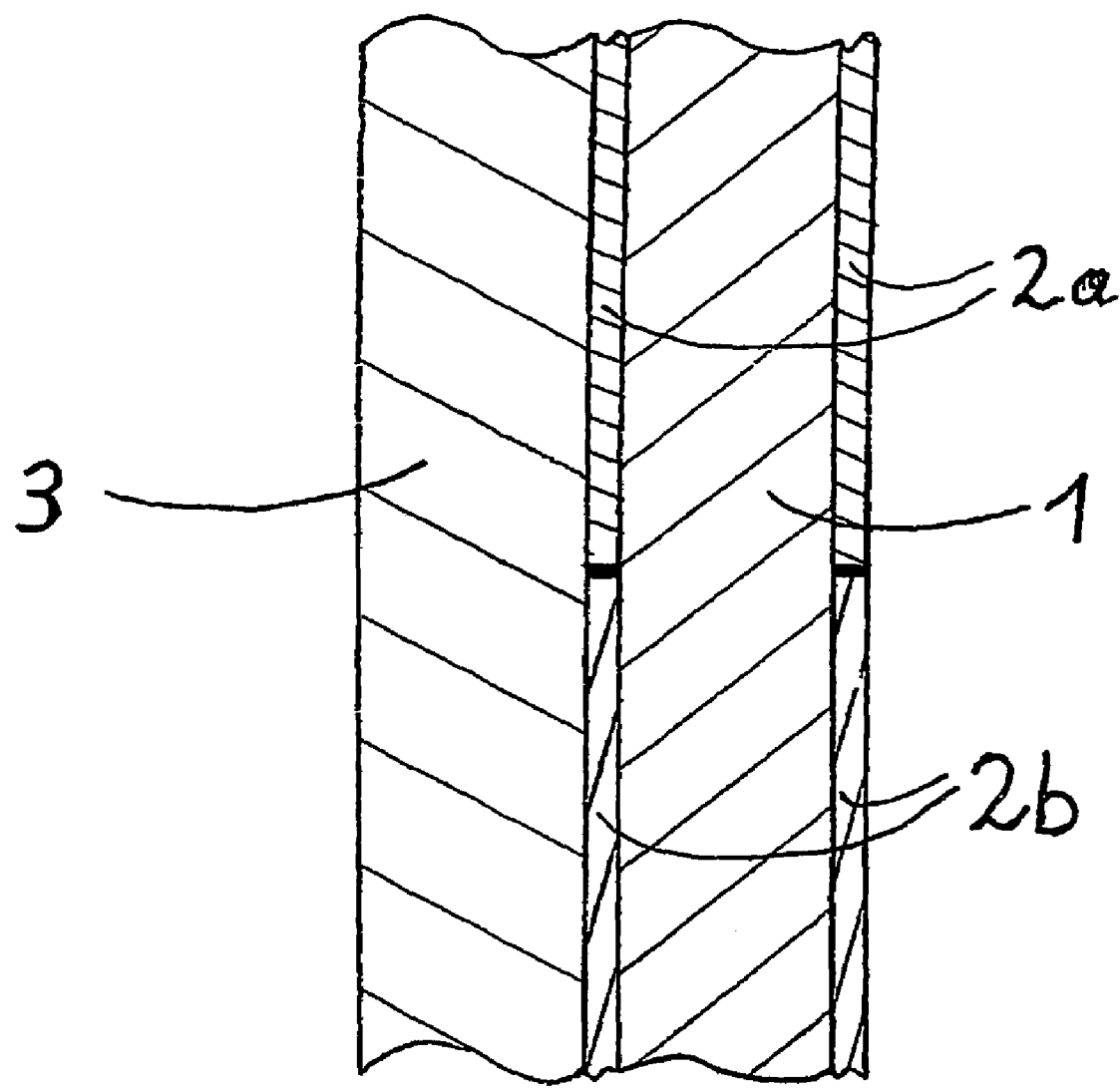
FIG. 1 schematically shows an embodiment of the present invention, ie an annular chromatograph having a chromatographic bed 1 inside an annular column, which is made of a material inert against the components of the reactants and the solvents and which rotates about an axis 3, and a thermo-jacket 2.

FIG. 1 shows a schematic cross-section through a P-CAC device as it is used for carrying out methods according to the present invention. Reference numeral 1 designates the particulate fixed-bed which is usually contained in a hollow cylindrical container, e.g. made of glass or stainless steel, which rotates about an axis 3 during operation. According to the present invention, this particle bed acts as both reaction catalyst and separating medium; these two functions may be carried out either simultaneously or successively, such as in the case of controlling temperature values along the height of the fixed-bed.

Such temperature control may, for example, be effected using thermo-jackets which are designated with reference numerals 2a and 2b in FIG. 1. If a zeolite is used, which shows an increased catalytic effect at elevated temperatures and a higher separating effect at lower temperatures, as has been mentioned above, it is possible to take advantage of this effect by selecting locally different temperatures. In a preferred embodiment, for example, the upper heating jacket 2a in FIG. 1 is operated with a heating medium at high temperatures, e.g. more than 150° C., while a medium of lower temperature, e.g. of 60 to 80° C., passes through the lower heating jacket 2b. The actual temperatures and media are to be chosen by the skilled artisan, depending on the reactants, the reaction solvent, the particulate material, and the pressure conditions, which can be obtained in the chromatograph used. It goes without saying that, for certain reactions, conditions are possible in which a cooling medium kept below room temperature is used within the lower jacket 2b of FIG. 1.

The scope of the invention also includes conditions in which three or more thermo-jackets 2 are provided one below the other, enabling the creation of several "hot reaction zones" which may be separated from each other by lower temperature zones, said zones, as opposed to prior art, being present in one single particle bed. However, in cases where several co-reactants are reacted with each other, such arrangements my lead to the above-mentioned problems relating to the differing migration speeds of the reactants, so that embodiments of this type are only preferred when reacting just one reactant or when one (of more) reactants is at the same used as solvent, as will be described below.

The number of thermo-jackets is not particularly limited. In practice, however, one to three at most, usually one or two, jackets are preferred, in order to keep the reaction procedure simple and therefore its costs low.

The area covered by each thermo-jacket, i.e. its relative height to the overall height of the particle bed, can be freely chosen by skilled artisans. Procedures in which a continuous temperature gradient is obtained in the particle bed of catalyst/separating medium are preferred according to the invention, in order to avoid any side reactions, which are caused by all-too-sudden changes in temperature and which are often hard to foresee, to the highest extent possible.

As the particulate material, it is possible to use, for example, a substantially inert material coated with at least one substance which is active as a catalyst and/or separating medium, or a material which is, for example, active as a separating medium and has been coated with a catalyst component, or vice-versa. It is further possible to use a mixture of separating and catalyst materials.

However, in order to guarantee maximum homogeneity, to maximize the performance of the process and to lower costs, preferred embodiments employ just one type of particulate material, which is particularly preferred to consist entirely of catalyst/separating medium. Here, specific ion exchange resins or zeolites are used.

According to invention, procedures are preferred in which the at least one reactant is dissolved in a solvent when being supplied, as this effectively avoids local fluctuations in concentration and leads to a more complete conversion. It is further preferred that the solvent also acts as eluent, which lowers the number of chemicals used and the complexity of the device, resulting in an overall reduction of costs. For reactions of several reactants, it is particularly preferred if one of them also acts as solvent (where possible).

The invention comprises reactions in which at least one reactant is converted into at least one final product, with the particle bed serving as catalyst for the reaction(s) on the one hand and as separating medium for the purification of the at least one final product on the other. It is also possible to pre-purify one or more reactants. This means that the at least one reactant must pass through a separating zone before entering the reaction zone, whereupon it may eventually be purified in a second separating zone. This may be realized, for example, by arranging a thermo-jacket at medium height of the particle bed only.

Examples of reactions in which only one reactant is reacted include decomposition reactions or rearrangement reactions, where a desired final product can be prepared and additionally also purified from occurring by-products in the same fixed bed using the method according to the present invention.

The invention is particularly suitable for reactions of polyvalent reactants with which more than just one reaction product is obtainable. Apart from enabling the recovery of one desired final product in pure form, out of all those obtainable, the method according to the present invention also allows the by-products (which can be obtained in pure form, too) to be recirculated to the feed, by using a preparative annular chromatograph from which different substances are withdrawn through outlets provided at different angular positions, and subsequently to be reacted (and purified) once again in the particle bed.

Nevertheless, by means of the method according to invention, even reactions of this type can be optimized in such a way that substantially only the desired final product accumulates, thereby avoiding the device-related complexity which the recirculation of by-products inevitably entails.

In the following, the present invention will be described and explained in more detail by reference to three groups of examples of such optimizations as preferred embodiments of the present invention.

EXAMPLES

1) Preparation of Triacetin

Example 1.1

The aim of this experiment, as well as that of Examples 2 and 3, was to determine the effect of the eluent flow rate on the purity of triacetin, because the amount of eluent in the annular chromatograph was to be minimized for economic reasons. However, the eluent flow rate should be sufficiently high to ensure that the stationary phase is regenerated. Therefore, an optimal eluent flow rate must exist for a given feed flow rate and rotation speed.

The annular chromatograph was packed to a height of 21.4 cm with a bed consisting if 569.4 g of DOWEX 50 W X 8™ (Dow Chemical Company; sulfonated polystyrene/divinylbenzene-based highly acidic cation exchange resin) ion exchange resin with a particle size of 200-400 mesh. A feed mixture of 1004.9 g of acetic acid and 564.3 g of glycerol was used, while pure acetic acid was used as the eluent. The feed mixture was injected at a flow rate of 0.6 ml/min, and the eluent flow rate was set at 25 ml/min. The annular chromatograph was rotated at 70°/h, and the resulting width of the feed band was 3.4 cm. Tubings were attached to 28 of the 90 outlets at the bottom of the annular chromatograph and bundled to groups of four. Each group of four tubings was connected to a glass container so that seven different fractions were collected. The measured concentration profile of the seven fractions is shown in FIG. 2.1. All components are shown, with the exception of the eluent (=reactant) acetic acid, which is not plotted in order to get a better overview.

As can be seen from FIG. 2.1, all of the glycerol and the monoacetin have been converted into diacetin, triacetin and water. The maximum triacetin concentration was a mass fraction of more than 23%. However, the highly concentrated triacetin fractions contained over 2% diacetin and water as impurities. This is most likely due to a poor regeneration of the column, as also the fractions around 0° had a water content of about 2%. Water is especially difficult to remove from the ion exchange resin, which means that an eluent flow rate higher than 25 ml/min is required to regenerate the column. Water is not only an impurity, but also causes the reverse reaction of triacetin to diacetin.

Example 1.2

In this example, all of the operating conditions were the same as in Example 1.1, except that the eluent flow rate was 45 ml/min. The feed band was 2.5 cm in width. The resulting concentration profile is shown in FIG. 2.2. The eluent acetic acid is again excluded to obtain a better overview of the products. The product peaks are shifted to lower angles, which can be assumed to be the result of the higher linear velocity and the lower residence time at a higher eluent rate.

Although the maximum of the triacetin peak was a little lower than in the previous example, the triacetin fractions contained less water and less diacetin. The injection of the acetic acid as eluent at higher flow rates had several effects. The water on the ion exchange resin was displaced faster, which led to a better regeneration of the chromatographic bed. Since acetic acid was also a reactant, higher flow rates led to a shift of the chemical equilibrium in favor of the products. One negative effect, which can be seen in FIG. 2.2, was the further dilution of the product. This effect led to the lower maximum of the triacetin peak. At this point, however, the advantages of the better regeneration of the column and the shift of the chemical equilibrium overweighed.

Example 1.3

In this example, the parameters were all the same as in the previous examples, except that the eluent flow rate was 65 ml/min. The feed band was 1.8 cm in width. The measured concentration profile is shown in FIG. 2.3.

The products were much more diluted than in the previous examples and the maximum of the triacetin peak remained below 14%. The concentration of the impurities in the triacetin fractions, i.e. diacetin and water, were also higher than in Example 1.2. Here, the positive effects of a higher eluent flow rate, that have been shown in Example 1.2, were outweighed by the negative effects, i.e. the dilution of the products and the lower residence time. The reason was that the regeneration of the column did no longer play a role because the column had already regenerated well at an eluent flow rate of 45 ml/min. On the other hand, a lower residence time allowed less opportunity for the reaction and the separation of products to take place. If less time is left for the reaction, the shift of the chemical equilibrium, which is caused by a higher flow rate of acetic acid, cannot show any effect.

The influence of the eluent flow rate on the total yield of triacetin and the production of triacetin with a purity of 90% is shown in FIG. 2.4 and FIG. 2.5.

The yield and the production of triacetin both show a maximum because of the effects mentioned. At low eluent flow rates, the column was not regenerated well, which results in water in the triacetin fractions and an unfavorable shift of the chemical equilibrium. As the eluent flow rate increases, this effect plays a lesser role, leading to an increase in yield and production. However, a further increase of the eluent flow rate beyond a certain point, which is linked to a lower residence time and higher linear velocity, does not allow enough time for reaction and separation.

Example 1.4

Another parameter of importance is the rotation speed. With the increase of the rotation speed, the components of the injected feed were carried to higher angles and therefore exposed to a broader section of the resin bed. The exposure to more of the regenerated resin could provide for better separation of the components, but also led to dilution, because the resin was saturated with eluent. Furthermore, the residence time had to be long enough in order to allow for better separation. Otherwise, the effect of dilution of the products overweighed. The good regeneration of the resin is also a prerequisite for good separation. As is shown in FIG. 2.4, the highest yield of triacetin at a rotation speed of 70°/h was achieved with an eluent flow rate of 55 ml/min. The concentration profile is shown in FIG. 2.6.

Since this eluent flow rate led to the highest yield, it was taken as the basis to study the influence of the rotation speed to see whether the remaining triacetin could be purified. This flow rate was also high enough to ensure good regeneration of the column. The results for higher rotational speeds will be discussed in Example 1.5 and 1.6.

Example 1.5

FIG. 2.7 shows the concentration profile for the same conditions as in Example 4, except that the rotation speed was increased to 80°/h. As expected, the peaks are shifted to higher angles. However, no triacetin fractions with a purity of more than 90% were collected and the total yield of triacetin was 80.3%, as opposed to 96.9% in Example 1.4. This means that the effect of dilution, which was mentioned in Example 1.4, has already outweighed the possibility of better separation of the products. The dilution of the products becomes more obvious in Example 1.6.

Example 1.6

In this example, the rotation speed was further increased to 90°/h. The resulting concentration profile is shown in FIG. 2.8. The peaks were further shifted to higher angles and the maximum of the triacetin peak was lower than in the previous examples. Along with the broadening of the peak, compared with the previous examples, the lower maximum was a clear sign of the dilution of the products. This means that the eluent flow rate of 55 ml/min was too high to see the effect of better separation at increased rotation speeds because the residence time was too low. As a result, only the dilution of the products could be observed.

2) Preparation of Bisphenol A

Example 2.1

As in the case of the preparation of triacetin, the aim of this example, as well as of Examples 2.2 and 2.3, is to determine the effect of the eluent flow rate on the purity of bisphenol A. The eluent flow rate should be minimized for economic reasons, but has to be high enough to enable the regeneration of the chromatographic bed.

For the preparation of bisphenol A from acetone and phenol, the resin Amberlyst 31™ (Rohm & Haas Company; sulfonated polystyrene/divinylbenzene-based highly acidic cation exchange resin) with a particle size of 550-700 µm was used. The height of the resin bed was 21.5 cm. Pure acetone was used as feed and pure phenol as eluent. As acetone is not as viscous as glycerol, a higher feed flow rate could be used in this case, and the feed band was 2.0 cm in width. The annular chromatograph was rotated at a speed of 70°/h. Seven fractions were collected, as were when synthesizing triacetin. The results are shown in FIG. 3.1. The eluent phenol was left out for better overview. As shown in FIG. 3.1, acetone was almost completely converted into bisphenol A and water.

Due to the low eluent flow rate, the bisphenol A peak was relatively broad and appeared very late. As in the case of triacetin, water is especially difficult to displace from the resin, but in this case there was virtually no water present at low angles. Since only one reaction takes place, less water is produced than in the preparation of triacetin. As a result, the regeneration of the column was achieved more easily. However, the bisphenol A was rather diluted because the regeneration of the bed required a relatively large amount of phenol.

Example 2.2

In this example, the same operating conditions as in the previous one were used, except that the eluent flow rate was raised to 45 ml/min. The width of the feed band was 2.0 cm. As a result of the lower viscosity of acetone, compared to glycerol, the width of the feed band did not change as much as in the preparation of triacetin. With this lower viscosity, the feed had not been dispersed as much in the layers of glass beads before it entered the resin bed. The resulting concentration profile is shown in FIG. 3.2. As expected, the peak of bisphenol A was shifted to lower angles.

Although the amount of acetone was less than two percent, this impurity played a greater role because the bisphenol A already was quite diluted. As in the case of triacetin, a higher eluent flow rate, and with it a higher linear velocity, led to a dilution of the products and allowed less time for the reaction and the separation of the products. However, as the eluent phenol was also a reactant, higher eluent flow rates also led to a shift of the chemical equilibrium in favor of the products. Here, the shift of the chemical equilibrium started to outweigh the effect of the higher linear velocity because even the fraction having the maximal concentration of bisphenol A contained some acetone.

Example 2.3

In this example, the eluent flow rate was increased to 75 ml/min and the feed band was 2.0 cm in width. FIG. 3.3 shows the concentration profile. The peak of bisphenol A is much narrower than before and the position is hardly shifted, compared to Example 2.2, because less bisphenol A has been produced. FIG. 3.3 shows a large peak of unreacted acetone. Under these conditions, the effect of the high linear velocity, which allows less time for reaction and separation, was dominant because small amounts of water also appeared in the fractions of bisphenol A. On the other hand, the shift of the chemical equilibrium no longer played a role. Unlike in the previous examples, no fraction of pure bisphenol A could be obtained.

FIG. 3.4 shows the total yield of bisphenol A, with respect to acetone, as a function of the eluent flow rate. In FIG. 3.5, the dependency of the amount of bisphenol A produced per unit of time on the eluent flow rate is shown. The total yield decreases continuously. On the other hand, the production of pure bisphenol A shows a clear maximum, due to the two major effects mentioned above. At low flow rates, the regeneration of the column was not as good as at higher rates, and the chemical equilibrium can still be shifted in favor of the products. Beyond the maximum of production, an increase in the eluent flow rate, and with it an increase in linear velocity, allowed less time for reaction and separation. At high flow rates, the production of pure bisphenol A did not decrease as quickly as the production of pure triacetin. Since there were only two products, the separation of bisphenol A and water was much easier than the separation of similar products such as triacetin and diacetin.

Example 2.4

The next step was to study the influence of the rotation speed on the concentration profile. It was decided to use an eluent flow rate of 25 ml/min and a feed flow rate of 1.6 ml/min. The bisphenol A production with this eluent flow rate is to the left of the maximum shown in FIG. 3.5. The concentration profile for a rotation speed of 70°/h is shown in FIG. 3.6.

As is shown in FIG. 3.6, there was still a large amount of bisphenol A, but an acetone peak had already started to appear at 40°. Increasing the rotation speed meant that the components of the bands which came from the acetone used were shifted to higher angles and therefore exposed to a broader section of the resin bed. As a result, the exposure to more of the resin bed could achieve better separation of the components, but also led to dilution, because the resin was saturated with eluent, just as in the case of triacetin. FIG. 3.6 shows that the regeneration of the column was complete and the residence time still long enough to allow high conversion of acetone. As a result, there was enough room for an increase in the rotation speed.

Example 2.5

In this example, the conditions were the same as in the previous one, except that the rotation speed was raised to 80°/h. FIG. 3.7 shows the resulting concentration profile. The amount of unreacted acetone was slightly lower than in the previous case.

The total yield of bisphenol A, with respect to acetone, was 87.9%, compared to 85.8% in Example 2.4. However, since the increase in the total yield was quite small, it was not possible to collect more fractions of bisphenol A which had a purity of more than 90%. This is because of the dilution of the products, due to the exposure to more eluent, as mentioned in Example 2.4. This becomes clearer by considering the fraction at 24°. In Example 2.4, this fraction still contained 4.9% of bisphenol A, while in Example 2.5 it contained only 1.6%. Although this fraction did not appear at the peak maximum, it did not contain any acetone like the fractions above 40°.

Example 2.6

Since the increase in total yield from Example 2.4 to Example 2.5 was rather small, it was decided to further increase the rotation speed. FIG. 3.8 shows the concentration profile at a rotation speed of 90°/h. The peak of bisphenol A was slightly shifted to higher angles, although the peak maximum was at the same point as for Example 2.5. No further increase in the total yield was obtained and the production of bisphenol with a purity of over 90% decreased from 146 g/h to 141 g/h. There was no major content of bisphenol A at 24° and nearly all other fractions contained some unreacted acetone.

3) Preparation of Methyl Acetate

For the esterification of methanol and acetic acid to methyl acetate and water, Amberlyst 15™ with a particle size of 300-840 μm was used, and the annular chromatograph was packed with a resin bed which was 21.7 cm high. Samples were collected for two complete rotations. Pure methanol was used as eluent and acetic acid as feed. Due to the strong adsorption of all components, much higher eluent flow rates were required than in the case of triacetin or bisphenol A in order to ensure the regeneration of the resin. The retention angles were also much higher in the case of methyl acetate. In this example, the eluent flow rate was 75 ml/min and the feed flow rate was 1.9 ml/min. Seven fractions were collected. A rotation speed of 70°/h was applied. The feed band was only 0.75 cm in width, but because of the large particle size, the feed band was dispersed in the resin bed. FIG. 4.1 shows the resulting concentration profile. In order to give a better overview, the eluent methanol is left out.

FIG. 4.1 shows one advantage of the higher retention angle. The feed band encounters a large amount of resin in a broad sector of the column before reaching the outlets. There are several opportunities for the reaction and the separation of the products. However, the large amount of eluent that is required must be taken in to consideration.

Example 3.2

The broad range of eluent flow rates that where investigated led to a significant shift of the retention angles. Therefore, the outlets at which the fractions were collected had to be changed. In this example, the conditions were the same as in the previous one, except that the eluent flow rate was increased to 100 ml/min. The resulting concentration profile is shown in FIG. 4.2.

There is still a pronounced peak of pure methyl acetate and, as expected, the peak is narrower than in the previous example. In all other cases, the higher linear velocity at a higher eluent flow rate allowed less time for reaction and separation. This simple reaction, however, is fast enough so that this effect plays a lesser role. It has to be mentioned that a higher eluent flow rate also leads to a better generation of the resin bed and therefore to less impurities in the product during the next rotations.

Example 3.3

In this example, the eluent flow rate was increased to 115 ml/min, while all other conditions were the same as in the previous examples. Two eluent pumps were required to achieve this flow rate. The resulting concentration profile is shown in FIG. 4.3. The methyl acetate peak is again shifted, and there is only one methyl acetate fraction of over 50%. The influence of the low residence time still did not show any effects and has been compensated by the better regeneration.

The influence of the eluent flow rate on the yield of methyl acetate, with respect to acetic acid, was minimal, as shown in FIG. 4.4, but as in the other cases the yield showed a maximum. The production of pure methyl acetate also showed a maximum at high eluent flow rates, as illustrated in FIG. 4.5. The maximums greatly depended on the system under study. As mentioned, higher eluent flow rates led to a higher linear velocity and allowed less time for reaction and separation. However, simple reactions, like the esterification of methanol and acetic acid, allow enough room for high eluent flow rates and a low residence time if the reaction rates are fast enough.

The invention claimed is:

1. A method for preparing at least one chemical reaction product by means of chemical reaction of one or more reactants, optionally dissolved in one or more solvents, which are supplied as a feed flow, through the contact with a heterogeneous catalyst in a continuously operated fixed-bed reactor packed with a particle bed, a continuous annular chromatograph (CAC), packed with said particle bed, being used as said fixed-bed reactor in which said at least one reaction product is formed and purified and said at least one purified reaction product as well as any by-products and/or unreacted reactants present are withdrawn from said annular chromatograph each at a different and predetermined rotational angle position, using only one type of particulate material in a single particle bed as both catalyst for the formation of said at least one reaction product in said particle bed and as chromatographic medium for the purification thereof, and recirculating and reusing any unreacted reactants and/or by-products in the chemical reaction.

2. The method according to claim 1, characterized in that said particulate material comprises a catalyst material which is uniformly distributed therein and/or thereon.

3. The method according to claim 1, characterized in that said particulate material entirely consists of catalyst material.

4. The method according to claim 1, characterized in that an ion exchange resin is packed as said particulate material.

5. The method according to claim 1, characterized in that a zeolite is packed as said particulate material.

6. The method according to claim 1, characterized in that said particle bed is heated and/or cooled during said reaction/purification.

7. The method according to claim 1, characterized in that several zones of different temperatures are created by heating and/or cooling during said reaction/purification.

8. The method according to claim 1, characterized in that a continuous temperature gradient is set by heating and/or cooling during said reaction/purification.

9. The method according to claim 1, characterized in that at least one reactant is supplied in a solvent.

10. The method according to claim 9, characterized in that any unreacted reactants and/or by-products are recirculated and reused in the chemical reaction.

11. The method according to claim 1, characterized in that at least one of the reactants supplied is a polyvalent reactant from which several different reaction products are formed during the reaction.

12. The method according to claim 1, characterized in that acetic acid and glycerol are supplied as reactants and triacetin is recovered as the reaction product.

13. The method according to claim 1, characterized in that phenol and acetone are supplied as reactants and bisphenol A is recovered as the reaction product.

14. The method according to claim 1, characterized in that acetic acid and methanol are supplied as reactants and methyl acetate is recovered as the reaction product.

15. A method for preparing at least one chemical reaction product by means of chemical reaction of one or more reactants, optionally dissolved in one or more solvents, which are supplied as a feed flow, through the contact with a heterogeneous catalyst in a continuously operated fixed-bed reactor packed with a particle bed, a continuous annular chromatograph (CAC), packed with said particle bed, being used as said fixed-bed reactor in which said at least one reaction product is formed and purified and said at least one purified reaction product as well as any by-products and/or unreacted reactants present are withdrawn from said annular chromatograph each at a different and predetermined rotational angle position, using only one type of particulate material in a single particle bed as both catalyst for the formation of said at least one reaction product in said particle bed and as chromatographic medium for the purification thereof and at least one reactant is supplied in a solvent.

16. The method according to claim 15, characterized in that said solvent at the same time acts as eluent.

17. The method according to claim 15, characterized in that at least one of the reactants acts as solvent.

18. A method for preparing at least one chemical reaction product by means of chemical reaction of one or more reactants, optionally dissolved in one or more solvents, which are supplied as a feed flow, through the contact with a heterogeneous catalyst in a continuously operated fixed-bed reactor packed with a particle bed, a continuous annular chromatograph (CAC), packed with said particle bed, being used as said fixed-bed reactor in which said at least one reaction product is formed and purified and said at least one purified reaction product as well as any by-products and/or unreacted reactants present are withdrawn from said annular chromatograph each at a different and predetermined rotational angle position, using only one type of particulate material in a single particle bed as both catalyst for the formation of said at least one reaction product in said particle bed and as chromatographic medium for the purification thereof and at least one of the reactants supplied is a polyvalent reactant from which several different reaction products are formed during the reaction.

19. The method according to claim 18, characterized in that one of all possible reaction products is preferentially recovered by controlling the operating parameters.

20. The method according to claim 19, characterized in that it is substantially said one reaction product which is recovered.

21. A method for preparing at least one chemical reaction product by means of chemical reaction of one or more reactants, optionally dissolved in one or more solvents, which are supplied as a feed flow, through the contact with a heterogeneous catalyst in a continuously operated fixed-bed reactor packed with a particle bed, a continuous annular chromatograph (CAC), packed with said particle bed, being used as said fixed-bed reactor in which said at least one reaction product is formed and purified and said at least one purified reaction product as well as any by-products and/or unreacted reactants present are withdrawn from said annular chromatograph each at a different and predetermined rotational angle position, using only one type of particulate material in a single particle bed as both catalyst for the formation of said at least one reaction product in said particle bed and as chromatographic medium for the purification thereof, and acetic acid and glycerol are supplied as reactants and triacetin is recovered as the preferred reaction product.

22. A method for preparing at least one chemical reaction product by means of chemical reaction of one or more reactants, optionally dissolved in one or more solvents, which are supplied as a feed flow, through the contact with a heterogeneous catalyst in a continuously operated fixed-bed reactor packed with a particle bed, a continuous annular chromatograph (CAC), packed with said particle bed, being used as said fixed-bed reactor in which said at least one reaction product, is formed and purified and said at least one purified reaction product as well as any by-products and/or unreacted reactants present are withdrawn from said annular chromatograph each at a different and predetermined rotational angle position, using only one type of particulate material in a single particle bed as both catalyst for the formation of said at least one reaction product in said particle bed and as chromatographic medium for the purification thereof, and phenol and acetone are supplied as reactants and bisphenol A is recovered as the preferred reaction product.

23. A method for preparing at least one chemical reaction product by means of chemical reaction of one or more reactants, optionally dissolved in one or more solvents, which are supplied as a feed flow, through the contact with a heterogeneous catalyst in a continuously operated fixed-bed reactor packed with a particle bed, a continuous annular chromatograph (CAC), packed with said particle bed, being used as said fixed-bed reactor in which said at least one reaction product is formed and purified and said at least one purified reaction product as well as any by-products and/or unreacted reactants present are withdrawn from said annular chromatograph each at a different and predetermined rotational angle position, using only one type of particulate material in a single particle bed as both catalyst for the formation of said at least one reaction product in said particle bed and as chromatographic medium for the purification thereof, and acetic acid and acetone are supplied as reactants and methyl acetate is recovered as the preferred reaction product.

* * * * *